United States Patent

[11] 3,607,218

[72] Inventors Goro Akashi;
Masaaki Fujiyama, both of Odawara-shi, Japan
[21] Appl. No. 853,970
[22] Filed Aug. 28, 1969
[45] Patented Sept. 21, 1971
[73] Assignee Fuji Photo Film Co., Ltd
Ashigara-Kamigum, Kanagawa, Japan
[32] Priority Aug. 29, 1968
[33] Japan
[31] 43/61974

[54] PROCESS FOR THE PRODUCTION OF MAGNETIC SUBSTANCES
7 Claims, No Drawings

[52] U.S. Cl. .......... 75/0.5 AA, 148/105
[51] Int. Cl. .......... B22f 9/00, H01f 1/02, H01f 1/20
[50] Field of Search .......... 148/31.55, 105, 103, 108, 31.57, 104; 75/0.5 A, 0.5 AA

[56] References Cited

UNITED STATES PATENTS

| | | | |
|---|---|---|---|
| 2,687,951 | 8/1954 | Whaley | 75/0.5 A |
| 2,740,708 | 4/1956 | Papee | 75/0.5 A |
| 3,206,338 | 9/1965 | Miller et al. | 75/0.5 AA |
| 3,498,918 | 3/1970 | Copp | 148/104 |

*Primary Examiner*—L. Dewayne Rutledge
*Assistant Examiner*—W. W. Stallard
*Attorney*—Sughrue, Rothwell, Mion, Zinn & Macpeak

ABSTRACT: Producing ferromagnetic metal powders by the reduction of a ferromagnetic metal salt using hypophosphite ions can be improved by adding a viscosity increasing material to the aqueous reaction system.

PROCESS FOR THE PRODUCTION OF MAGNETIC SUBSTANCES

BACKGROUND OF THE INVENTION

1. Field of the Invention

The present invention relates to a process for the production of magnetic substances used for magnetic recording mediums, such as, audio tapes, video tapes, memory tapes, and the like, and in particular to a process for producing magnetic substances comprising fine metal particles.

2. Description of the Prior Art

Magnetic recording mediums are now widely used in various technical fields for recording and reproducing electrical or magnetic signals. As magnetic substances generally employed in such magnetic recording mediums there are the powders of ferromagnetic iron oxide and powders or thin films of magnetic alloys. Among them, the ferromagnetic-type magnetic substances have been most predominately utilized for magnetic recording mediums. However, recently the field of application of the magnetic recording mediums has extended to high-density recording and magnetic substances such as alloy powders or metallic thin films having characteristics suitable for this purpose. That is, high-density recording is a recording of signals having short wavelengths, and in the magnetic substances used for high-density recording the following characteristics are required: the coercive force is considerably high; the magnetic flux density is high; and when the magnetic substances are magnetic powders, the particle size is small.

On considering the above, the inventors previously developed a process for the production of ferromagnetic metal powders comprising reducing a salt of a ferromagnetic metal in an aqueous solution having an adjusted pH of higher than 5 in the presence of a hypophosphite under the action of, if necessary, a magnetic field or ultrasonic waves.

SUMMARY OF THE INVENTION

In a process for producing ferromagnetic metal powders by reducing a salt in a ferromagnetic metal in an aqueous solution in the presence of hypophosphite ions, a novel improvement comprises adding a viscosity increasing agent to the aqueous solution. By increasing the viscosity of the solution, an improved product is obtained.

It is thus an object of the present invention to provide an improved process for producing ferromagnetic particles.

The inventors have further investigated improving the above invention, and have developed a process of producing magnetic substances having fine particle size and other excellent characteristics particularly suitable for high density recording.

DETAILED DESCRIPTION OF THE PREFERRED EMBODIMENTS

That is, according to the present invention, there is provided a process for producing magnetic substances by reducing a salt of a magnetic metal in an aqueous solution in the presence of a compound containing the hypophosphite ion in which a viscosity increasing material is added to said aqueous solution and, if necessary, a magnetic field or a magnetic field and ultrasonic waves are applied to the reaction system.

The main novel feature of the present invention resides in the point of desirably controlling the particle size of the magnetic metal powders or particles (which are formed by adding the hypophosphite ions to an aqueous solution of a salt of a ferromagnetic metal) by adding to said aqueous solution a water-soluble viscosity increasing material, such as, gelatin, water glass, carboxymethylcellulose, polyvinyl alcohol, a vinylic resin containing maleic anhydride and the like. In this case, by applying a magnetic field or a magnetic field and ultrasonic waves to the reaction system, the magnetic characteristics of the magnetic substances produced can be further As illustrative viscosity increasing agents used in the present invention, there are gelatin, maleic anhydride-vinyl acetate copolymer, water glass, polyvinyl alcohol, carboxymethylcellulose, glycerine, polyethylene, glycol, and other hydrophilic high molecular weight materials. They are used in a pH range wherein they form no precipitate and no gelation occurs, and also under conditions wherein ions can exist in the solution.

The effect of the present invention appears when the viscosity of the reaction system becomes 2–3 centipoises at reaction temperature, but the effect increases rapidly when the viscosity becomes several 10 centipoises to several 10 poises.

When the viscosity of the system is higher than several hundred poises, the effect may be higher, but the workability of the reaction is reduced when the viscosity of the reaction system is too high, and hence such a high viscosity is undesirable except for special specific cases. As to the finding of the particle sizes of the magnetic substances, the effect of the present invention can be sufficiently obtained even at a viscosity which is too high for "practical" operation, and hence no particular limitation is necessary with respect to the viscosity range in the present invention.

The invention will further be explained practically by the following examples.

EXAMPLE 1

Solution A and solution B having the following compositions were prepared and they were mixed.

| | | |
|---|---|---|
| Solution A | | |
| | $CoSO_4 \cdot 7H_2O$ | 7 g. |
| | $NaC_4H_4O_6 , 2H_2O$ | 50 g. |
| | $H_3BO_3$ | 15 g. |
| | Water | 300 ml. |
| Solution B | | |
| | $H_3PO_2$(50% aqueous solution) | 20 ml. |

The mixture was then mixed with water to make 500 ml. of the solution and after adjusting the pH of the system to 10.5–11.0, the reaction of the system was conducted at a temperature of 60° C. and in an alternating current magnetic field of 50 cycles/sec. and 750 gauss to provide Co powders (control sample). The same procedure as above was repeated while adding to the reaction system gelatin in an amount of 0.5 g., 1 g., 2 g., 5 g., 10 g., 25 g., or 50 g. each to provide samples 01, 02, 03, 04, 05, 06, or 07. The grain size and the magnetization characteristics of the samples prepared above were measured, the results of which are shown in table 1.

TABLE 1

| Sample | Grain size (length × width) | iHc |
|---|---|---|
| Control | 3.5μ×0.7μ | 200 oe |
| 01 | 1.7μ×0.3μ | 230 oe |
| 02 | 1.4μ×0.2μ | 270 oe |
| 03 | 1.0μ×0.2μ | 300 oe |
| 04 | 0.8μ×0.15μ | 320 oe |
| 05 | 0.7μ×0.15μ | 350 oe |
| 06 | 0.6μ×0.12μ | 360 oe |
| 07 | 0.5μ×0.1μ | 385 oe |

From the results shown in table 1, it is clear that the addition of gelatin effectively reduced the particle size of the magnetic powders produced. This is quite preferred in making magnetic recording tapes. Also, by the addition of gelatin the

EXAMPLE 2

Solutions A, B and C having the following compositions respectively were prepared:

| | |
|---|---|
| Solution A | |
| $NiSo_4 \cdot 7H_2O$ | 3 g. |
| $ClSO_4 \cdot 7H_2O$ | 4 g. |
| $NaC_4H_4O_6 \cdot 2H_2O$ | 50 g. |
| $H_3BO_3$ | 15 g. |
| Water | 300 ml. |
| Solution B | |
| $H_3PO_2$ (5% aqueous solution) | 20 ml. |
| Solution C | |
| $PdCl_2$ | 0.01 g. |
| Water | 50 ml. |

These solutions were mixed together and after adding water to the resulting solution mixture to make 500 ml. of the solution and adjusting the pH thereof to 8.5–9.0, the reaction was carried out for 10 minutes at 50° C. while applying an alternating current magnetic field of 50 cylces/sec. and 700 gauss and ultrasonic waves of 100 kilocycles, to thereby provide alloy powders having a particles size of 0.6$\mu$×0.15 $\mu$and a coercive force of 300 oe.

On the other hand, when the above procedure was repeated employing 40 g. of a maleic anhydride-vinyl acetate copolymer in a reaction system according to the present invention, alloy powders having a particle size of 0.2$\mu$× 0.07$\mu$and a coercive force of 460 oe were obtained. That is, the particle size could be reduced and the coercive force could be increased by the application of the present invention.

EXAMPLE 3

The same procedures as example 2 were repeated without applying the magnetic field and ultrasonic waves. The particle size and the coercive force of alloy powders obtained without using the maleic anhydride-vinyl acetate copolymer were 0.8$\mu$×0.6$\mu$and 110 oe, respectively, whereas those of the alloy powders obtained using the maleic anhydride-vinyl acetate copolymer according to the present invention were 0.3$\mu$× 0.2$\mu$and and 220 oe, respectively. In other words, the effect of the presence of the viscosity increasing agent was remarkable even when the magnetic field and ultrasonic waves were not employed.

What is claimed is:

1. In a process for producing ferromagnetic metal powders by reducing at least one salt of a ferromagnetic metal in an aqueous solution in the presence of hypophosphite ions, the improvement which comprises adding a viscosity increasing agent to said aqueous solution prior to reaction to increase the viscosity of said aqueous solution.

2. The process as claimed in claim 1 wherein said viscosity increasing agent is selected from the group consisting of gelatin, a maleic anhydride-vinyl acetate copolymer, water glass, polyvinyl alcohol, carboxymethylcellulose, glycerine, and polyethylene glycol.

3. In a process for producing ferromagnetic metal powders by reducing at least one salt of a ferromagnetic metal in an aqueous solution in the presence of hypophosphite ions, the improvement which comprises adding a viscosity increasing agent to said aqueous solution preliminary to reaction to increase the viscosity of said solution and carrying out said reducing reaction while applying a magnetic field.

4. The process as claimed in claim 3 wherein said viscosity increasing agent is selected from the group consisting of gelatin, a maleic anhydride-vinyl acetate copolymer, water glass, polyvinyl alcohol, carboxymethylcellulose, glycerine, and polyethylene glycol.

5. The process of claim 3 wherein said reducing reaction is further carried out under the application of ultrasonic vibrations to the reaction system.

6. The process of claim 1 wherein the viscosity of said aqueous solution is at least greater than 2 centipoises.

7. The process of claim 3 wherein the viscosity of said aqueous solution is at least greater than 2 centipoises.

UNITED STATES PATENT OFFICE

CERTIFICATE OF CORRECTION

PATENT NO. : 3,607,218

DATED : August 28, 1969

INVENTOR(S) : Goro Akashi et al

It is certified that error appears in the above-identified patent and that said Letters Patent are hereby corrected as shown below:

IN THE SPECIFICATION:

Column 1, line 73 after "further" add the language --improved and the particle sizes of the magnetic powders can be made uniform--.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*